C. Levey. Planing Machine.

No. 112,821 — Patented Mar. 21 1871

Witnesses:
A. W. Almquist
L. S. Mabee

Inventor:
C. Levey
Munn & Co.
Attorneys.

UNITED STATES PATENT OFFICE.

CHARLES LEVEY, OF TORONTO, CANADA.

IMPROVEMENT IN PLANING-MACHINES.

Specification forming part of Letters Patent No. 112,821, dated March 21, 1871.

*To all whom it may concern:*

Be it known that I, CHARLES LEVEY, of the city of Toronto, in the Province of Ontario and Dominion of Canada, have invented a new and useful Improvement in Planing-Machines; and I do hereby declare that the following is a full, clear, and exact description thereof, which will enable others skilled in the art to make and use the same, reference being had to the accompanying drawing, forming part of this specification, in which—

Figure 1:
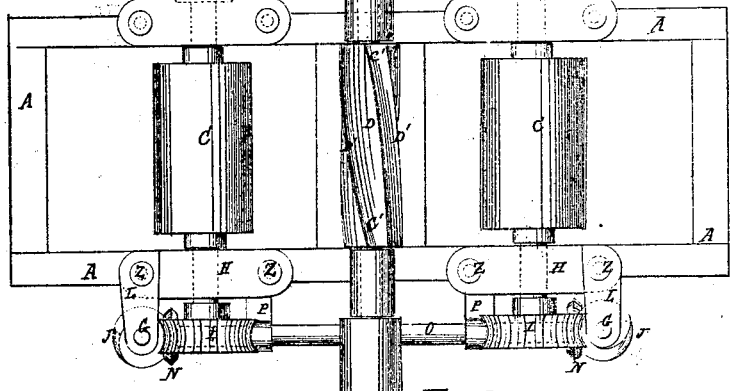
Figure 2:
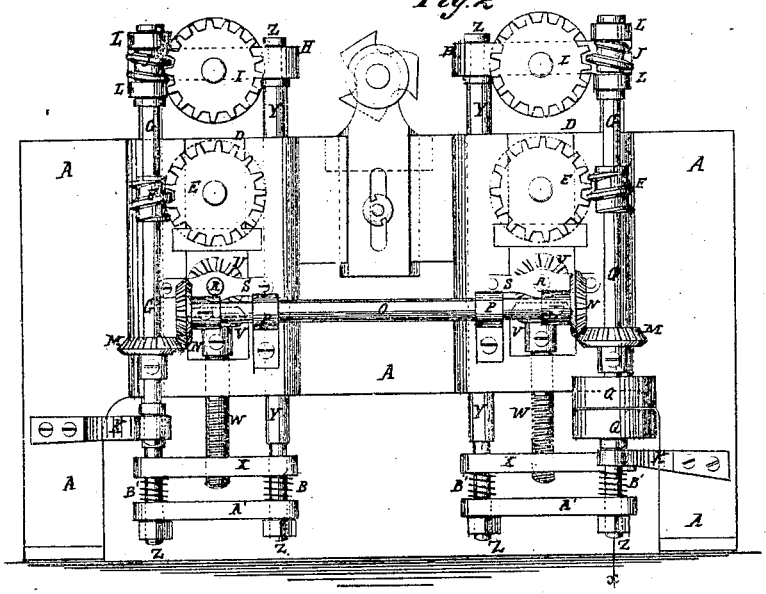
Figure 3:
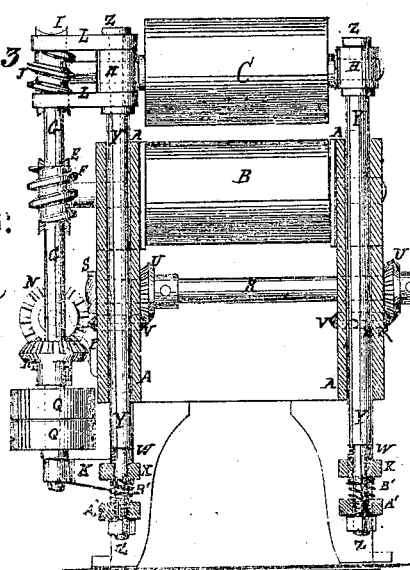

Figure 1 is a top view of my improved machine. Fig. 2 is a side view of the same. Fig. 3 is a detail vertical cross-section of the same, taken through the line $x\ x$, Fig. 2.

Similar letters of reference indicate corresponding parts.

My invention has for its object to improve the construction of planing, matching, molding, and other wood-working machines, so as to make them more readily adjusted and more effective in operation than machines constructed in the ordinary manner; and the invention consists in the peculiar arrangement of shafts, gears, and rollers, whereby the upper of two feeding-rolls may be raised or lowered simultaneously with sliding worm-gears on two of the vertically-adjustable shafts, the due elastic effect of coiled springs on said upper roll being meanwhile preserved, and both rolls continuing their operation upon the lumber.

A is the frame of the machine. B are the lower, and C are the upper, feed-rolls.

The journals of the lower feed-rolls, B, revolve in boxes D, which are set in notches or slots in the upper part of the frame A. One of the journals of each of the lower feed-rolls B projects, and to it is attached a worm-wheel, E, which meshes into the worm F, attached to the vertical driving-shaft G.

The journals of the upper feed-rolls, C, revolve in the movable boxes H. One of the journals of each of the upper feed-rolls C projects, and has a worm-wheel, I, attached to it, which meshes into the worm J, placed upon the vertical driving-shaft G, and secured to it in such a way that it may slide up and down upon the shaft freely while being at the same time carried around by and with the said shaft in its revolution.

The lower ends of the vertical driving-shafts G revolve in a step, K, attached to or formed upon the frame A, and its upper end passes through and revolves in bearings in the arms or plates L, attached to or formed upon the top and bottom of one end of the boxes H, and between which arms or plates the upper worm, J, is placed, so that the said worm J may be moved up and down upon the shaft G as the upper feed-rolls, C, move up and down, thus keeping the worm-wheels I and worms J always in gear with each other, whether the feed-rolls be working closer together or farther apart.

To the two shafts G are attached bevel-gear wheels M, the teeth of which mesh into the teeth of the bevel-gear wheels N, attached to the ends of the horizontal shaft O, which revolves in brackets or bearings P, attached to the frame A. By this construction both sets of feed-rolls will be revolved with exactly the same velocity.

To the lower part of one of the vertical driving-shafts G are attached fast and loose pulleys Q, to receive the driving-belt.

R are shafts extending across the frame A of the machine directly below the feed-rollers B C, and which revolve in brackets or bearings S, attached to the frame A. To one end or both ends of each of the shafts R is attached a crank, T, for convenience in operating them.

To the end parts of the shafts R are attached bevel-gear wheels U, the teeth of which mesh into the teeth of the gear-wheels V, attached to or formed upon the upper ends of the screws W. The screws W are swiveled to the frame A, and pass through the long nuts or bars X, so that by turning the said screws the said nuts or bars X may be raised or lowered.

Upon the ends of the nuts or bars X rest, or to them are attached, the lower ends of the tubular rods Y, the upper ends of which rest against or are attached to the ends of the journal-boxes H, so that the said journal-boxes, and with them the upper feed-rolls, C, may be raised and lowered by raising and lowering the nuts or bars X.

Z are rods or long bolts, that pass down through the ends of the journal-boxes H, through the tubular rods Y, through the ends of the nuts or bars X, and through the ends of the bars A', as shown in Figs. 2 and 3. The rods Z have heads or nuts formed upon both ends, so that the journal-boxes H cannot rise without raising the bars A'.

B' are coiled or other springs interposed between the nuts or bars X and bars A', as shown in Figs. 2 and 3, to give elasticity to the upper feed-rolls, C, so that they may yield to accommodate themselves to inequalities of the surface being operated upon.

By this construction both ends of the upper feed-rolls may be adjusted simultaneously from below, thereby leaving the top of the rolls and cylinder open and free from the mechanism that usually encumbers them and renders their proper adjustment tedious and difficult.

C' is the cutter-head or knife-cylinder, the journals of which revolve in bearings attached to the frame A, upon which the knives or cutters D' are arranged spirally, and in such a way that the rear end of each preceding knife may be parallel with the forward end of each succeeding knife, thus producing a continuous motion, and preventing the beating or irregular motion in the ordinary machines resulting from the whole length of the knife striking the material at the same time.

I desire to be understood as laying no claim, broadly, to any construction or arrangement of particular or single parts of my machine; but,

Having thus described my invention, I claim as new and desire to secure by Letters Patent—

The arrangement, in the planing-machine herein described, of the swiveled screws W W, crank-shafts R T, bevel-gears U V, brackets or bearings S S, bars or nuts X X, tubular rods Y Y, journal-boxes H H, feed-roll C, with its worm-wheel I, the driving-shafts G G, arms or plates L L, carrying the sliding worms J J, rods Z Z, bars A' A', and coiled springs B', all constructed and operating as specified.

CHAS. LEVEY.

Witnesses:
H. MATHEWS,
    *Of the city of Toronto.*
JAMES CROWTHER,
    *Of same place.*